(12) United States Patent
Heelan et al.

(10) Patent No.: US 11,624,850 B2
(45) Date of Patent: Apr. 11, 2023

(54) MARINE SURVEY NODE AND SOIL SAMPLE MODULE

(71) Applicant: PGS Geophysical AS, Oslo (NO)

(72) Inventors: Philip Heelan, Oslo (NO); Eivind Rödnes Vesterås, Oslo (NO)

(73) Assignee: PGS Geophysical AS, Oslo (NO)

( * ) Notice: Subject to any disclaimer, the term of this patent is extended or adjusted under 35 U.S.C. 154(b) by 251 days.

(21) Appl. No.: 17/083,861

(22) Filed: Oct. 29, 2020

(65) Prior Publication Data
US 2021/0124075 A1 Apr. 29, 2021

Related U.S. Application Data

(60) Provisional application No. 62/927,205, filed on Oct. 29, 2019.

(51) Int. Cl.
| | | |
|---|---|---|
| *G01V 1/38* | (2006.01) | |
| *G01V 1/24* | (2006.01) | |
| *B63B 21/26* | (2006.01) | |
| *G01V 1/16* | (2006.01) | |
| *G01V 11/00* | (2006.01) | |
| *G01V 3/12* | (2006.01) | |

(52) U.S. Cl.
CPC ............ *G01V 1/3852* (2013.01); *B63B 21/26* (2013.01); *G01V 1/166* (2013.01); *G01V 1/247* (2013.01); *G01V 3/12* (2013.01); *G01V 11/00* (2013.01); *G01V 2210/1427* (2013.01)

(58) Field of Classification Search
CPC ...... G01V 1/3852; G01V 1/166; G01V 1/247; G01V 3/12; G01V 11/00; G01V 2210/1427; B63B 21/26
See application file for complete search history.

(56) References Cited

U.S. PATENT DOCUMENTS

| | | |
|---|---|---|
| 3,986,159 A | 10/1976 | Horn |
| 4,300,220 A | 11/1981 | Goff et al. |
| 5,022,012 A | 6/1991 | Godfrey et al. |

(Continued)

FOREIGN PATENT DOCUMENTS

| | | |
|---|---|---|
| CN | 106886048 | 6/2017 |
| KR | 100251890 B1 * | 4/2000 |
| WO | 2019139482 | 7/2019 |

OTHER PUBLICATIONS

Yoshida, Hiroshi et al; "New Attempts in the MR-X1 Sea-Trials: The Working AUV Tries to Survey of the Sea Floor and to Take Mud Samples", Paper No. OMAE-2010-20347; Proceedings of the ASME 2010 29th International Conference on Ocean, Offshore and Arctic Engineering: Jun. 6-11, 2010 (Year: 2010).*

*Primary Examiner* — Ian J Lobo

(57) ABSTRACT

A marine survey node can include a body to be deployed to a seabed, a marine survey receiver coupled to the body and to acquire marine survey data, and a soil sample module associated with the body to collect a soil sample from the seabed. A soil sample module can include a vessel, a first valve coupled to the vessel, and a spike coupled to the vessel. The spike can penetrate an earth surface. The first valve can maintain a pressure difference between the vessel and the spike when closed and equalize a pressure between the vessel and the spike when open. An inlet in the spike can equalize pressure between an inside of the spike and an outside of the spike and to collect a soil sample from the earth surface.

20 Claims, 10 Drawing Sheets

(56) References Cited

U.S. PATENT DOCUMENTS

| | | | |
|---|---|---|---|
| 5,922,974 A * | 7/1999 | Davison | G01N 1/405 |
| | | | 73/864.74 |
| 6,842,006 B2 * | 1/2005 | Conti | G01V 3/15 |
| | | | 324/365 |
| 6,951,138 B1 | 10/2005 | Jones | |
| 7,443,763 B2 * | 10/2008 | Swanson | G01V 1/38 |
| | | | 367/19 |
| 7,646,670 B2 | 1/2010 | Maxwell et al. | |
| D698,270 S | 1/2014 | Tamanaja | |
| 9,381,986 B2 * | 7/2016 | Brizard | B63B 21/26 |
| 9,383,471 B2 | 7/2016 | Tamanaja | |
| 9,457,879 B2 * | 10/2016 | Brizard | G01V 1/3852 |
| 10,099,760 B2 * | 10/2018 | Rokkan | B63G 8/001 |
| 10,386,520 B2 * | 8/2019 | Westerdahl | B63B 21/26 |
| 10,393,898 B2 | 8/2019 | Maxwell | |
| 10,488,540 B2 | 11/2019 | Olivier | |
| 2009/0308143 A1 | 12/2009 | Boggess | |
| 2014/0036952 A1 | 2/2014 | Marchetti et al. | |
| 2017/0016279 A1 | 1/2017 | Holloway | |
| 2019/0234848 A1 | 8/2019 | Karabacak et al. | |
| 2019/0250090 A1 | 8/2019 | Snacken et al. | |

\* cited by examiner

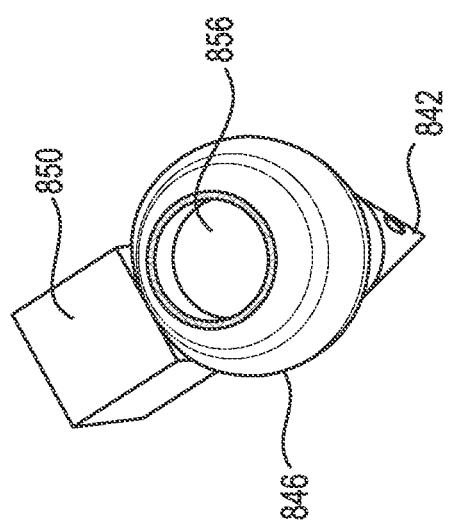
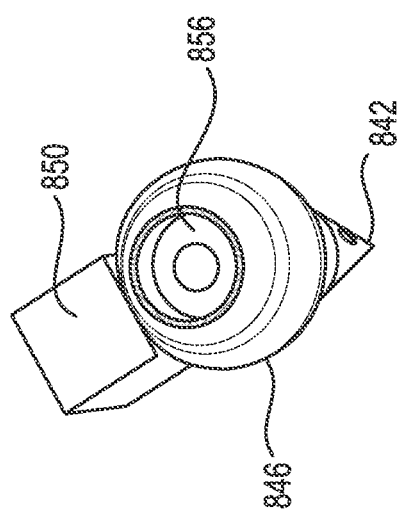
Fig. 8A
Fig. 8B

MARINE SURVEY NODE AND SOIL SAMPLE MODULE

CROSS-REFERENCE TO RELATED APPLICATIONS

This application claims priority to U.S. Provisional Application 62/927,205, filed Oct. 29, 2019, which is incorporated by reference as if entirely set forth herein.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more marine survey sources (hereinafter referred to as "sources") below the sea surface and over a subterranean formation to be surveyed. Marine survey receivers (hereinafter referred to as "receivers") may be located on or near the seabed, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be impulsive sources such as air guns, non-impulsive sources such as marine vibrator sources, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source.

BRIEF DESCRIPTION OF THE DRAWINGS

FIG. 8A is an enlarged sectional perspective view taken along cut line 8-8 of the soil sample module illustrated in FIG. 5 with a closed ball valve.

FIG. 8B is an enlarged sectional perspective view taken along cut line 8-8 of the soil sample module illustrated in FIG. 5 with an open ball valve.

DETAILED DESCRIPTION

Figure 1:
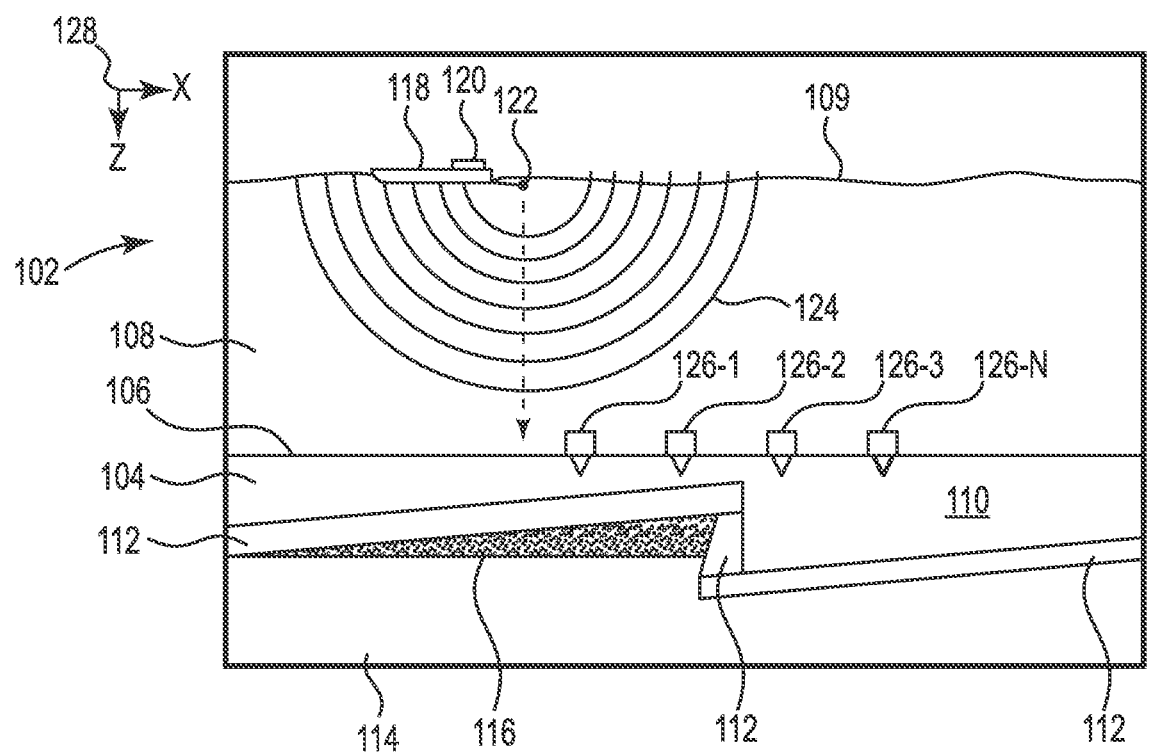
FIG. 1 is an elevation or xz-plane view of marine surveying in which signals are emitted by a source for recording by receivers.

The present disclosure is related to marine survey nodes. Marine survey nodes including receivers are an alternative or supplement to the receivers associated with towed streamers. Conventional marine survey nodes can be configured for seismic marine surveys or electromagnetic (EM) marine surveys. The use of marine survey nodes can provide advantages over streamers. Examples of such advantages include the additional payload being relatively small compared to a towed streamer and the potential for a relatively high spatial density of marine survey nodes compared to receivers on streamers. Marine survey nodes can provide good data quality but are slower to deploy compared to towing a streamer. According to at least one embodiment of the present disclosure, marine survey nodes are fitted with additional receivers and/or a soil sample module to further improve the quantity, type, and/or value of the data acquired via the marine survey nodes in comparison to conventional marine survey nodes. For example, a multi-component (seismic and EM) receiver system on a marine survey node can promote the use of multiple types of sources for a single marine survey. The marine survey nodes described herein can be deployed for use in combination with a towed streamer marine survey or without the use of towed streamers. According to at least one embodiment of the present disclosure, marine survey nodes provide additional illumination for a subset of a larger three-dimensional marine survey, resulting in increased illumination, or illumination for an area over which it is not possible to tow streamers, such as rigs, shallows, etc.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected and, unless stated otherwise, can include a wireless connection.

The figures herein follow a numbering convention in which the first digit or digits correspond to the drawing figure number and the remaining digits identify an element or component in the drawing. Similar elements or components between different figures may be identified by the use of similar digits. For example, 234 may reference element "34" in FIG. 2, and a similar element may be referenced as 334 in FIG. 3. Analogous elements within a Figure may be referenced with a hyphen and extra numeral or letter. Such analogous elements may be generally referenced without the hyphen and extra numeral or letter. For example, elements 122-1, 122-2, 122-3, and 122-N in FIG. 1 may be collectively referenced as 122. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is an elevation or xz-plane 128 view of marine surveying in which signals are emitted by a source 122 for recording by receivers. In FIG. 1, the receivers are associated with the marine survey nodes 126-1, 126-2, 126-3, . . . , 126-N. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 104 of sediment and rock below the surface 106 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, an underlying rock layer 114, and a hydrocarbon-saturated layer 116. One or more elements of the subsurface volume 104, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys in accordance with the present disclosure. The marine survey vessel 118 can tow a source 122 that produces signals as the marine survey vessel 118 moves across the sea surface 109. The source 122 may be towed by other vessels or may otherwise be disposed in fluid volume 108. The receivers may be located on ocean bottom cables or marine survey nodes 126 fixed at or near the surface 106. For the sake of efficiency, illustrations and descriptions herein show receivers located on marine survey nodes 126, but it should be understood that receivers can be located on a towed streamer or ocean bottom receiver cable. The marine survey vessel 118 can include a controller 120. For example, the controller 120 can be coupled to the source 122 to control actuation of the source 122.

According to at least one embodiment of the present disclosure, one or more of the marine survey nodes 126 include a soil sample module configured to collect a soil sample from the seabed near the surface 106. The seabed is also known as the seafloor or ocean bottom. The seabed is the bottom of the fluid volume 108, no matter how deep. The surface 106 is the top surface of the seabed. The soil sample module can be in addition to the receiver associated with the marine survey node. The marine survey nodes 126 can be deployed by the marine survey vessel 118 or a different marine survey vessel. The marine survey nodes 126 can be negatively buoyant so as to sink to the surface 106 after being deployed by a marine survey vessel. The soil samples can be analyzed to detect various environmental parameters of the soil, such as detecting the presence of microplastics or absorbed gases. Microplastics are small pieces of plastic that pollute the environment. According to the United States National Oceanic and Atmospheric Administration, any plastic fragment that is less than 5 millimeters in length constitutes a microplastic. However, as used herein, microplastic means small piece of plastic without a hard limit on its size. Sources of microplastics in the environment include cosmetics, clothing, industrial processes, product packaging, plastic bottles, plastic bags, etc. Absorbed gases can be an indication of a shallow hazard or significant seepage from below the seabed. In the absence of such scenarios, absorbed gases can be an indicator of the presence of hydrocarbons below the seabed. The soil sample can be analyzed to detect the presence of other pollutants. For embodiments in which the marine survey nodes 126 including soil sample modules are deployed over a survey area, the soil samples can be analyzed to provide pollution mapping over the survey area.

Although not specifically illustrated, the marine survey vessel 118 can tow one or more streamers generally located below the sea surface 109. The streamers can be long cables containing power and data-transmission lines (e.g., electrical, optical fiber, etc.) to which receivers may be coupled. In one type of marine survey, each receiver comprises a pair of sensors including a geophone that detects particle displacement within the water by detecting particle motion variation, such as velocities or accelerations, and/or a receiver that detects variations in pressure. However, embodiments are not so limited. Surveys can include receivers that are seismic sensors, such as pressure sensors or pressure and motion sensors, or EM sensors, among others. In one type of marine survey, each receiver comprises an EM receiver that detects EM energy within the water. The streamers and the marine survey vessel 118 can include sensing electronics and data-processing facilities that allow receiver readings to be correlated with absolute locations on the sea surface and absolute three-dimensional locations with respect to a three-dimensional coordinate system.

FIG. 1 shows acoustic energy illustrated as an expanding, spherical signal, illustrated as semicircles of increasing radius centered at the source 122, representing a down-going wavefield 124, following a signal emitted by the source 122. The down-going wavefield 124 is, in effect, shown in a vertical plane cross section in FIG. 1. The outward and downward expanding down-going wavefield 124 may eventually reach the surface 106, at which point the outward and downward expanding down-going wavefield 124 may partially scatter, may partially reflect back toward the marine survey nodes 126, and may partially refract downward into the subsurface volume 104, becoming elastic signals within the subsurface volume 104.

Figure 2:
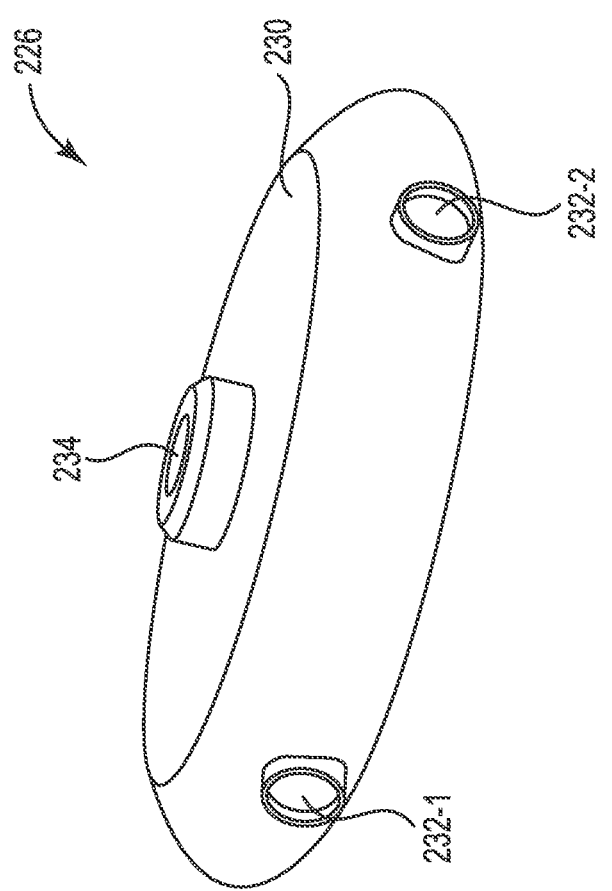
FIG. 2 is a perspective view of an exemplary embodiment of a marine survey node.

FIG. 2 is a perspective view of an exemplary embodiment of a marine survey node 226. The marine survey node 226 includes a body 230 configured to be deployed to a seabed. The marine survey node 226 is negatively buoyant to facilitate deployment to the seabed. In at least one embodiment, the body 230 is floodable to provide a configurable buoyancy. The body 230 can be flooded to provide negative buoyancy for deployment to the seabed. The body can be evacuated of water to provide positive buoyancy for retrieval from the seabed. As illustrated, the body 230 can be generally disc shaped, however embodiments are not limited to a particular shape. A generally wide body 230, such as that illustrated, can facilitate settling of the marine survey node 226 on the seabed in a horizontal orientation.

Figure 4:
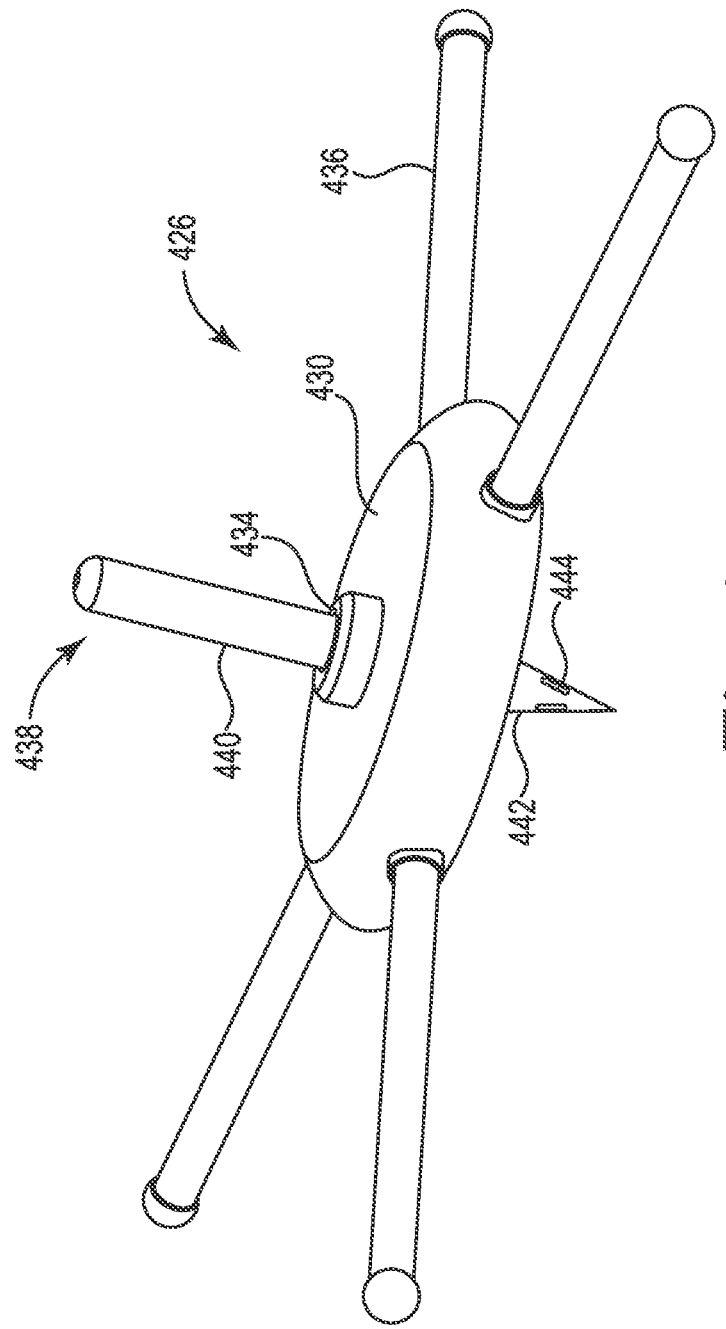
FIG. 4 is a perspective view of an exemplary embodiment of a marine survey node with a soil sample module.

A center 234 of the body 230 of the marine survey node 226 can be configured to receive a soil sample module. The center 234 of the body 230 can be defined by an opening through the body 230. In at least one embodiment, the center 234 of the body 230 includes a mechanical coupling for securing the soil sample module to the body 230. In at least one embodiment, the center 234 of the body 230 includes electrical, optical, or other connections configured to communicate with the soil sample module. An example of a soil sample module associated with the body 230 is illustrated in FIG. 4. In at least one embodiment, the soil sample module can be integral to the body 230 (not removable therefrom).

A marine survey receiver can be coupled to the body 230 and configured to acquire marine survey data. The receiver can be a seismic sensor or an EM sensor. In at least one embodiment, the marine survey node 226 includes both a seismic sensor and an EM sensor. The marine survey node 226 can include attachment points 232-1, 232-2 in the body 230. The attachment points 232 are each configured to receive a respective EM sensor. Embodiments are not limited to a particular number of attachment points 232 in the body 230. The attachment points 232 can include a mechanical coupling for securing the EM sensors to the body 230. The attachment points 232 can include electrical, optical, or other connections configured to communicate with the EM sensors. An example of EM sensors coupled to the body 230 is illustrated in FIG. 3.

Although not specifically illustrated, the marine survey node 226 can include additional equipment. The additional equipment can include a seismic sensor coupled to the body 230. For example, the seismic sensor can be housed within the body 230 such that the seismic sensor is contained entirely within the body 230. The additional equipment can include a processing resource, a memory resource, a transmitter, or transceiver, and/or an acoustic positioning device, such as a beacon, among other additional equipment to facilitate the use of the marine survey node 226 for carrying out a marine survey. The marine survey node 226 can thereby be configured to acquire (receive and/or record) marine survey data. In at least one embodiment, the marine survey node 226 is configured to transmit marine survey data to other marine survey nodes 226, or to an object at or near the sea surface, such as a marine survey vessel or a beacon. Although not specifically illustrated, the marine survey node 226 can be coupled to a communication cable connecting it to other marine survey nodes 226 or to objects at or near the sea surface to facilitate transmission of marine survey data. In at least one embodiment, the marine survey node 226 performs some processing of marine survey data and/or soil sample data. The additional equipment can include one or more sensors configured to detect the presence of microplastics, configured to detect the presence of absorbed gasses, or both. The memory resources can store instructions executable by the processing resources to perform the testing based on the soil sample and data acquired by the one or more sensors. In at least one embodiment, the marine survey node 226 does not perform processing of the marine survey data or the soil sample data.

Figure 3:
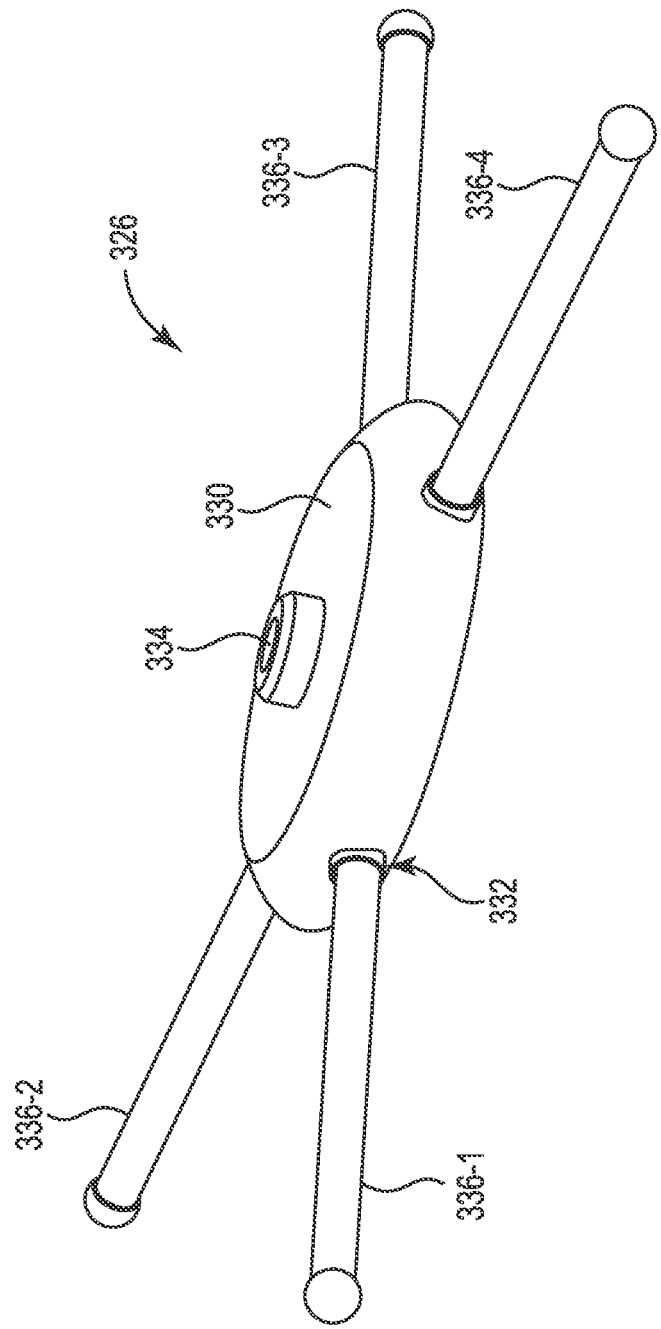
FIG. 3 is a perspective view of an exemplary embodiment of a marine survey node with electromagnetic receivers.

FIG. 3 is a perspective view of an exemplary embodiment of a marine survey node 326 with EM sensors 336-1, 336-2, 336-3, 336-4. A center 334 of the body 330 of the marine survey node 326 can be configured to receive a soil sample module. The EM sensors 336 are coupled to the attachment points 332 in the body 330 of the marine survey node 326. Although four EM sensors 336 are illustrated, embodiments are not limited to a particular number of EM sensors 336 being coupled to coupleable to the marine survey node 326. The EM sensors 336 are illustrated as EM sensor arms, however embodiments are not limited to a particular configuration of the EM sensors 336. The marine survey node 326 is configurable such that different numbers and/or types of EM sensors 336 can be used depending on the parameters of the marine survey to be conducted. The EM sensors 336 can include electrodes and/or magnetic coils to facilitate sensing of EM marine survey data.

In at least one embodiment, the marine survey node 326 includes a seismic sensor (not illustrated) in addition to the EM sensors 336. A marine survey node 326 including both seismic sensors and EM sensors 336 can be beneficial for combined seismic and EM marine surveys to reduce the cost or complexity of the marine survey. For example, some combined seismic and EM marine surveys include towing different types of streamers (seismic and EM) by a single marine survey vessel or towing of different types of streamers by different marine survey vessels. Other types of combined seismic and EM surveys may include the use of seismic or EM marine survey nodes and a towed streamer of the opposite type. However, according to at least one embodiment of the present disclosure, marine survey nodes 326 can include both seismic and EM sensors 336 to acquire seismic and EM data for a combined survey.

FIG. 4 is a perspective view of an exemplary embodiment of a marine survey node 426 with a soil sample module 438. The soil sample module 438 is associated with the body 430 of the marine survey node 426. The soil sample module 438 can pass through the center 434 of the body 430 and be removably coupled to the body 430. Such removable coupling can be advantageous for efficient storage of multiple marine survey nodes 426 on a marine survey vessel. The bodies 430 of the marine survey nodes 426 can be stored separately or at least detached from the soil sample modules 438 to take up less space on the marine survey vessel. Furthermore, some marine surveys may make use of some marine survey nodes 426 with the soil sample modules 438 and some without the soil sample modules 438. Therefore, it is beneficial to be able to selectively associate the soil sample modules 438 with the marine survey nodes 426. However, it at least one embodiment, the soil sample module 438 can be integral with to the body 430 (not removable therefrom).

The marine survey node 426 can be negatively buoyant such that it sinks to the seabed when deployed. The soil sample module 438 can be configured to anchor the marine survey node 426 to the seabed. The soil sample module 438 can comprise a vessel 440 coupled to a spike 442. The soil sample module 438 can pass through the center 434 of the marine survey node 426 such that the spike 442 is deployed on a bottom of the marine survey node 426 in a direction facing the seabed. Although not specifically illustrated, in at least one embodiment, the soil sample module 438 can pass through the marine survey node 426 through an opening that is off-center in the body 430. Although not specifically illustrated, in at least one embodiment, the soil sample module 438 can pass through the marine survey node 426 through an opening that is not perpendicular to a surface defining the bottom of the body 430. For example, the soil sample module 438 can pass through the body 430 in a diagonal orientation to facilitate anchoring the marine survey node 426 on an uneven seabed. As the marine survey node 426 sinks to the seabed, the spike 442 can be driven into the seabed by the motion and negative buoyancy of the marine survey node 426. The spike 442 is configured to penetrate the seabed. By being driven into the seabed, the soil sample module 438 can help anchor the marine survey node 426 to the seabed versus just being held on the seabed by its negative buoyancy. In at least one embodiment, the soil sample module 438 is configured to provide electromagnetic grounding for the marine survey node 426. For example, being driven into the seabed, the soil sample module 438 can thereby establish an electrical path to ground for the marine survey node 426 and/or the EM sensors 436 coupled thereto. The soil sample module 438 can effectively act as an antenna for better reception by onboard seismic equipment, such as sensors.

The soil sample module 438 is configured to collect a soil sample from the seabed. The spike 442 can include one or more inlets 444 configured to collect the soil sample and to equalize pressure between an inside of the vessel 440 and an outside of the vessel 440 (e.g., the water).

Figure 5:
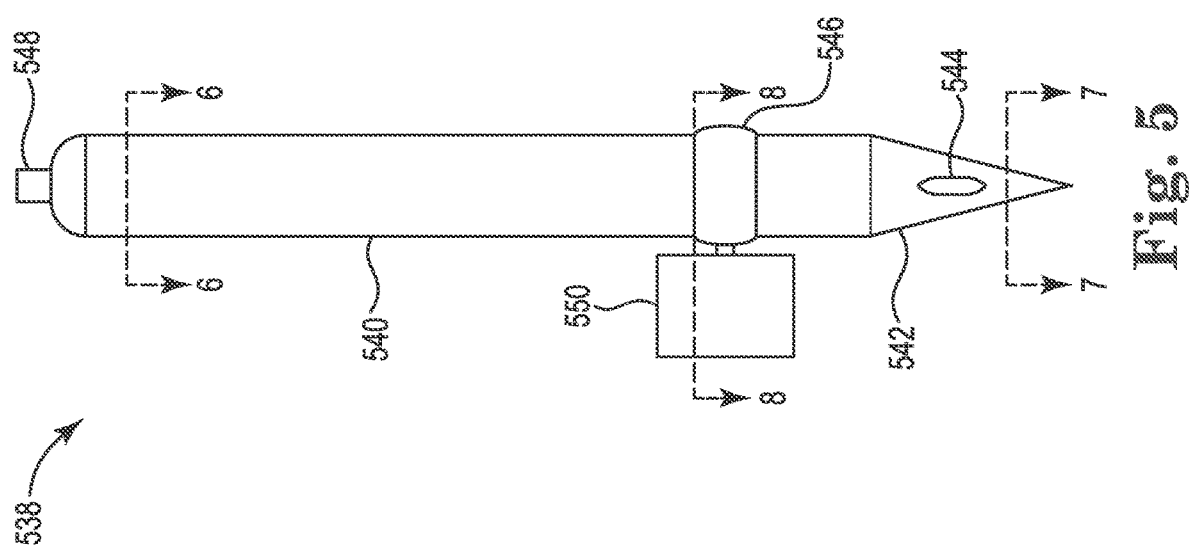
FIG. 5 is an elevation view of an exemplary embodiment of a soil sample module.

FIG. 5 is an elevation view of an exemplary embodiment of a soil sample module 538. The soil sample module 538 includes a vessel 540, a first valve 546 coupled to the vessel 540, and a spike 542 coupled to the vessel 540. The vessel 540 is a container designed to hold fluids at a pressure different from ambient pressure. The vessel 540 is also designed to hold solids, such as a soil sample. The spike 542 is configured to penetrate an earth surface, such as a seabed or dry bed. The first valve 546 is configured to maintain a pressure difference between the vessel 540 and the spike 542 when closed. The first valve 546 is configured to equalize a pressure between the vessel 540 and the spike 542 when open. For example, the first valve 546 can be a ball valve. An actuator 550 can be coupled to the first valve 546. The actuator 550 is configured to open and close the first valve 546.

The soil sample module 538 can include a second valve 548 coupled to the vessel 540. The second valve 548 is configured to close to maintain a pressure in the vessel 540 and to open to equalize the pressure in the vessel 540 and a pressure outside the vessel 540. In at least one embodiment, the second valve 548 is a pressure release valve. As illustrated, the second valve 548 can be on an opposite end of the vessel 540 relative to the spike 542. In at least one embodiment, the second valve 548 is configured to be coupled to a pump in order to reduce the pressure inside the vessel 540 below the atmospheric pressure of the environment in which the vessel 540 is situated. Such embodiments are useful for creating additional suction for capturing a soil sample as described in more detail below. Embodiments are not limited to the use of a pump to create a relatively low pressure inside the vessel 540. In at least one embodiment, the pressure difference between the environment from which the soil sample module 538 is deployed (e.g., sea level) and the environment at which the soil sample is collected (e.g., the seabed) is sufficiently large to generate the necessary suction. However, additional suction (provided by a pump) may be desired for use of the soil sample module 538 in shallow water applications or applications that are not under water.

The spike 542 includes an inlet 544 configured to equalize pressure between an inside of the spike 542 and an outside of the spike 542. The inside of the spike 542 is the volume defined by an inner surface of the spike 542. The outside of the spike 542 is the volume surrounding the outer surface of the spike 542. When the spike 542 penetrates the earth surface, the outside of the spike 542 is a volume of earth. The inlet 544 allows for the passage of fluids (such as air or water) or some solids (such as soil). As such, the inlet 544 is configured to collect a soil sample from the earth surface. In at least one embodiment, the spike 542 includes a plurality of inlets 544 configured to collect the soil sample and to equalize pressure between the inside of the spike 542 and the outside of the spike 542.

An example use of the soil sample module 538 includes deployment from a marine survey vessel in association with a marine survey node. Before deployment, the second valve 548 can be closed and the first valve 546 can be open so that the pressure inside the vessel 540 is essentially equal to the atmospheric pressure of the environment from which the soil sample module 538 is being deployed. Prior to deployment, the actuator 550 can be operated to close the first valve 546 so that the pressure inside the vessel 540 does not change after the soil sample module 538 is deployed. The soil sample module 538 can be deployed to a depth below the sea surface where the pressure is greater than at the sea surface or a given depth from which the soil sample module was deployed. At such a depth, the relative pressure inside the vessel 540 is less than the pressure outside the vessel 540. After the spike 542 of the soil sample module 538 penetrates the earth surface, the actuator 550 can be operated to open the first valve 546. This action exposes the relatively low pressure environment inside the vessel 540 to the relatively high pressure environment inside and outside of the spike 542. This relative pressure difference creates a suction force into the vessel 540 through the inlet 544 of the spike 542. This suction force causes some of the soil surrounding the spike 542 to be sucked into the spike 542 and into the vessel 540. After the pressure difference has been reduced and the soil sample has been collected inside the vessel 540, the actuator 550 can be operated to close the first valve 546, trapping the soil sample inside. When the soil sample module 538 is recovered, the second valve 548 may be opened to release the pressure inside the vessel 540 before opening the soil sample module to retrieve the soil.

Although not specifically illustrated, the vessel 540 can be coupled to the first valve 546 and/or the second valve 548 by a respective mechanical connection, such as a threaded mechanical connection. For example, the vessel 540 can have male or female threaded ends and the first valve 546 and the second valve 548 can have a respective male or female threaded end opposite of that of the vessel 540 ends. The first valve 546 can be screwed onto the vessel 540 and the second valve 548 can be screwed onto the vessel 540, thereby closing the soil sample module 538. The soil sample module 538 can be opened by unscrewing either or both of the first valve 546 and the second valve 548 from the vessel 540. In at least one embodiment, the spike 542 is removably coupled, such as by a threaded mechanical connection, to the portion of the vessel 540 extending below the first valve 546. Such embodiments are useful for replacing spikes 542 that become damaged or fouled from use. Although threaded mechanical connections are described as an example for coupling various components of the soil sample module 538, embodiments are not so limited. Other examples of mechanical couplings that can be used include friction fit and self-aligning taper-threading, among others.

Figure 6:
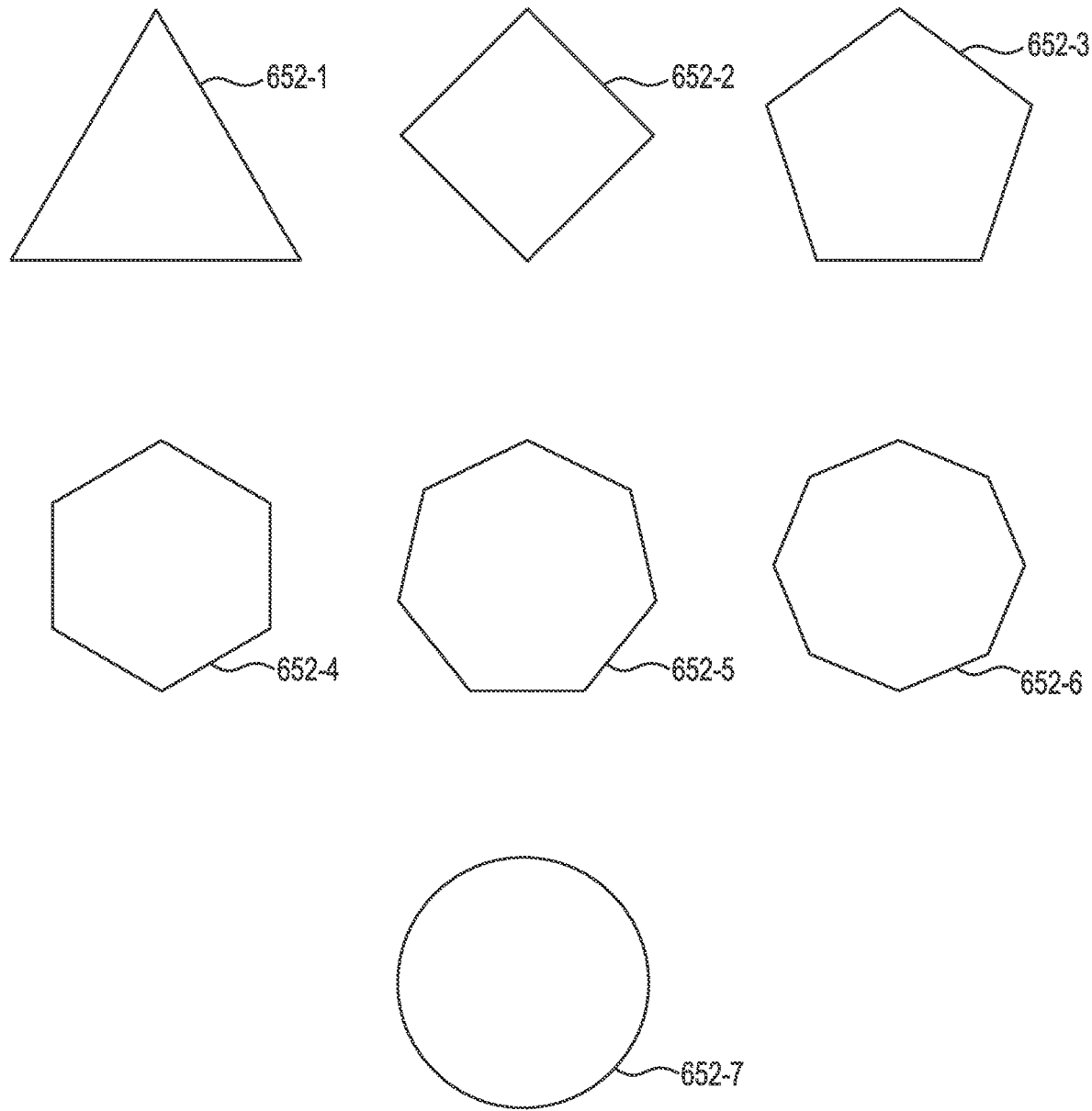
FIG. 6 illustrates examples of sectional views taken along cut line 6-6 of the vessel of the soil sample module illustrated in FIG. 5.

FIG. 6 illustrates examples of sectional views 652 taken along cut line 6-6 of the vessel of the soil sample module illustrated in FIG. 5. The sectional views 652 illustrate examples of different cross-sections of the vessel of the soil sample module. The vessel can have a polygonal body, as illustrated by the sectional views 652-1, 652-2, 652-3, 652-4, 652-5, 652-6 or a cylindrical body, as illustrated by the sectional view 652-7. At 652-1, the vessel is illustrated with a triangular cross section. At 652-2, the vessel is illustrated with a rectangular cross section. At 652-3, the vessel is illustrated with a pentagonal cross section. At 652-4, the vessel is illustrated with a hexagonal cross section. At 652-5, the vessel is illustrated with a heptagonal cross section. At 652-6, the vessel is illustrated with an octagonal cross section. At 652-7, the vessel is illustrated with a circular cross section. The examples illustrated in FIG. 6 are not to the exclusion of other cross sections.

Figure 7:
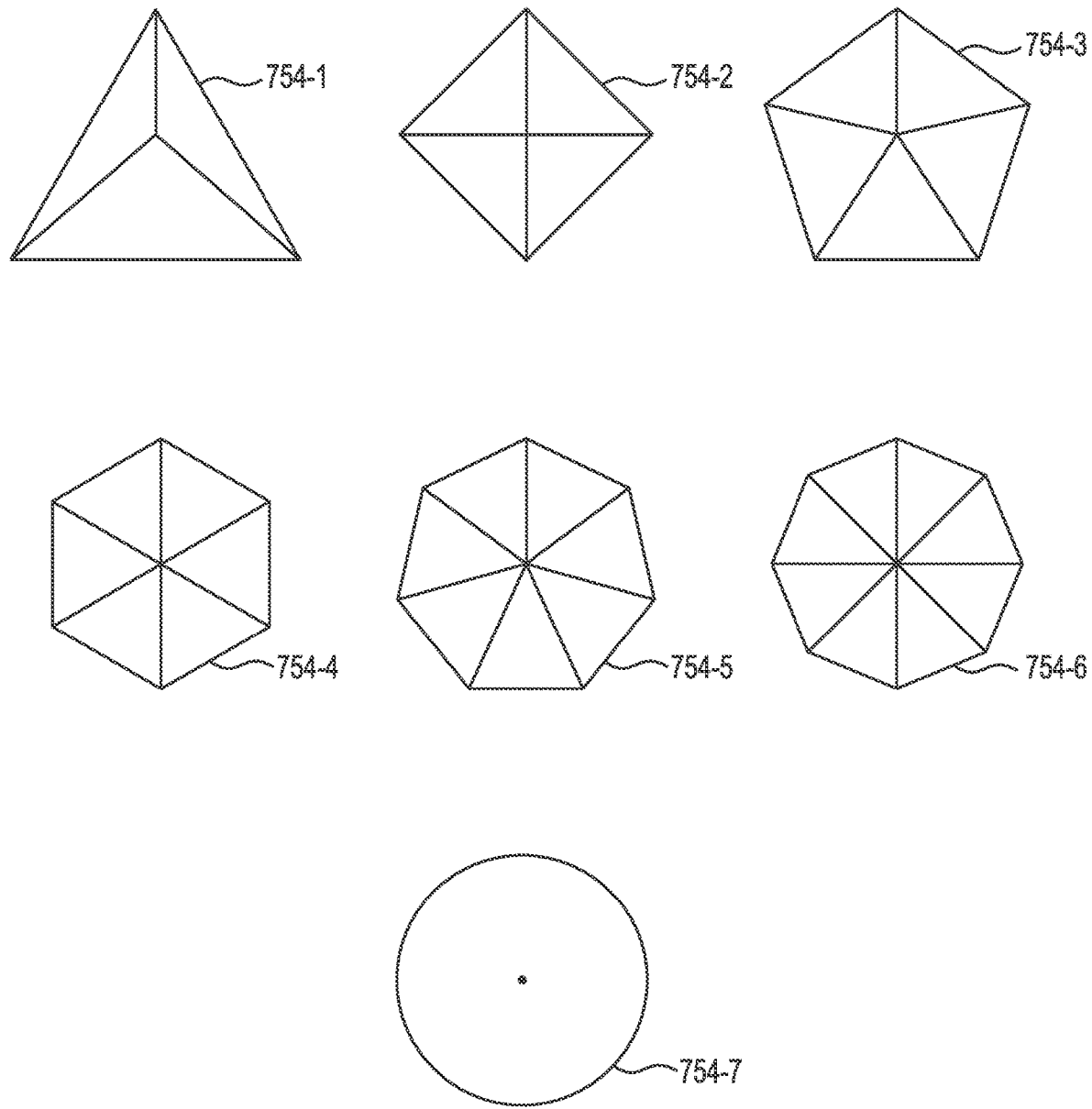
FIG. 7 illustrates examples of sectional views taken along cut line 7-7 of the spike of the soil sample module illustrated in FIG. 5.

FIG. 7 illustrates examples of sectional views 754 taken along cut line 7-7 of the spike of the soil sample module illustrated in FIG. 5. The sectional views 754 illustrate examples of different cross-sections of the spike of the soil sample module. Each of the sectional views 754 shows the spike ending in a point in the center of the sectional view 754. The spike can have a pyramidal body, as illustrated by the sectional views 754-1, 754-2, 754-3, 754-4, 754-5, 754-6 or a conical body, as illustrated by the sectional view 754-7.

At 754-1, the spike is illustrated as having a triangular pyramidal body. At 754-2, the spike is illustrated as having a rectangular pyramidal body. At 754-3, the spike is illustrated as having a pentagonal pyramidal body. At 754-4, the spike is illustrated as having a hexagonal pyramidal body. At 754-5, the spike is illustrated as having a heptagonal pyramidal body. At 754-6, the spike is illustrated as having an octagonal pyramidal body. At 754-7, the spike is illustrated as having a conical body. The examples illustrated in FIG. 7 are not to the exclusion of other body shapes for the spike.

FIG. 8A is an enlarged sectional perspective view taken along cut line 8-8 of the soil sample module illustrated in FIG. 5 with a closed ball valve 846. The valve 846 is analogous to the first valve 546 illustrated in FIG. 5. The valve 846 includes a ball 856 coupled to an actuator 850. The ball 856 can be coupled to the actuator 850 by a shaft and the actuator 850 can rotate the shaft. When the shaft rotates, the ball 856 rotates in kind. As illustrated in FIG. 8B, the ball 856 includes an aperture therethrough. However, when the valve 846 is closed, the ball 856 is rotated such that the aperture is facing the housing of the valve 846 and the solid surface of the ball 856 prevents any exchange of fluid between the spike 842 and the vessel (not illustrated). The valve 846 is configured to maintain a pressure difference between the vessel and the spike when closed.

FIG. 8B is an enlarged sectional perspective view taken along cut line 8-8 of the soil sample module illustrated in FIG. 5 with an open ball valve 846. In FIG. 8B, the ball 856 is illustrated with the aperture being in line with an axis extending through the vessel (not illustrated) and the spike 842 such that fluid can pass therethrough. The valve 846 is configured to equalize a pressure between the vessel and the spike 842 when open to collect the soil sample. The actuator 850 can rotate the shaft and thus the ball 856 to line up the aperture with the vessel and the spike 842 in order to open the valve 846. The actuator 850 can rotate the shaft and thus the ball 856 an amount, such as 90 degrees, to line up the aperture with the sidewalls of the valve 846 to close the valve 846.

Figure 9:
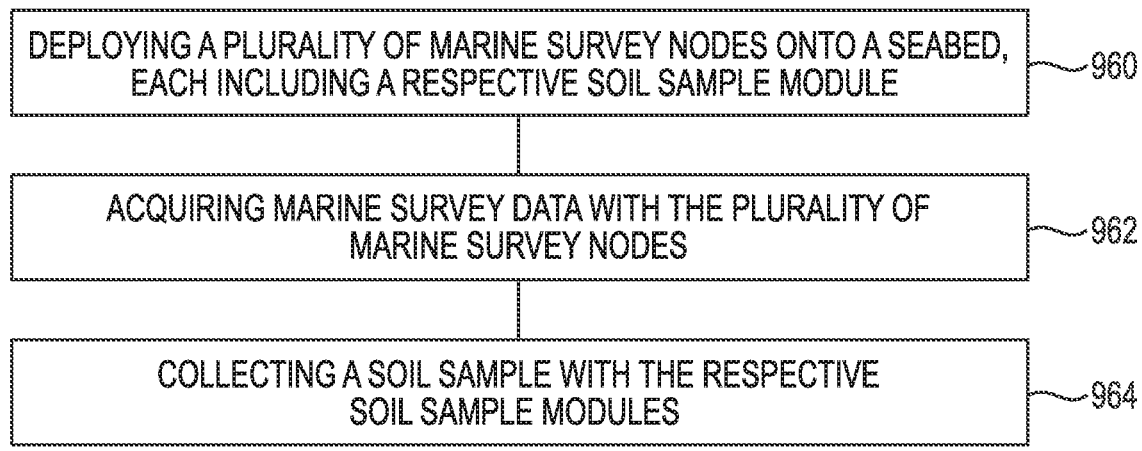
FIG. 9 illustrates an exemplary embodiment of a method for the use of a marine survey node.

FIG. 9 illustrates an exemplary embodiment of a method for the use of a marine survey node. At 960, the method can include deploying a plurality of marine survey nodes onto a seabed, each including a respective soil sample module. Prior to deploying a particular one of the marine survey nodes, the method can include sealing a vessel of the respective soil sample module. In at least one embodiment, the method can include reducing a pressure in the vessel after sealing the vessel, such as with a pump. The method can include deploying an additional plurality of marine survey nodes, not including soil sample modules, onto the seabed.

At 962, the method can include acquiring marine survey data with the plurality of marine survey nodes. Marine survey data can be acquired from marine survey nodes including soil sample modules and marine survey nodes not including soil sample modules. Acquiring the marine survey data can include acquiring at least one of seismic data and EM data.

At 964, the method can include collecting a soil sample with the respective soil sample modules. The method can include actuating a valve of a respective soil sample module so that a soil sample from the seabed enters a vessel of the respective soil sample module. The valve can be actuated again to seal the vessel with the soil sample therein. For example, the valve can be a ball valve as described with respect to FIGS. 8A-8B. The method can include performing at least one of microplastic testing and absorbed gas testing on the soil samples. Such testing can be performed after recovery of the soil sample from the soil sample module, for example, on a marine survey vessel or on shore. Such testing can be performed by the soil sample module itself, for example, where the soil sample module includes a processing resource and a memory resource storing instructions executable by the processing resource to perform the testing. In such embodiments, the soil sample module can further include one or more sensors configured to detect the presence of microplastics, configured to detect the presence of absorbed gasses, or both. The method can include performing pollution mapping over an area of the marine survey based on the soil samples. The marine survey can therefore beneficially be used to perform pollution mapping in addition to seismic and/or EM surveying with little additional cost versus conducting a separate pollution mapping survey of the seabed. Conventionally, pollution mapping surveys are either non-existent, or of a small scale as compared to the scale of a marine geophysical survey.

In accordance with at least one embodiment of the present disclosure, a geophysical data product may be produced or manufactured. Marine survey data may be acquired from a marine survey using a marine survey node including a receiver and a soil sample module. The marine survey data can be stored on a non-transitory, tangible machine-readable medium. The marine survey data can include soil sample data and at least one of seismic data and EM data. At least one of seismic data and EM data can be processed to generate first geophysical data. The soil sample data can be processed to generate second geophysical data. The geophysical data product may be produced by processing at least one of the seismic data, EM data, and soil sample data offshore or onshore either within the United States or in another country. The first and the second geophysical data can be recorded on at least one non-transitory machine-readable medium, thereby creating the geophysical data product. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore.

Figure 10:
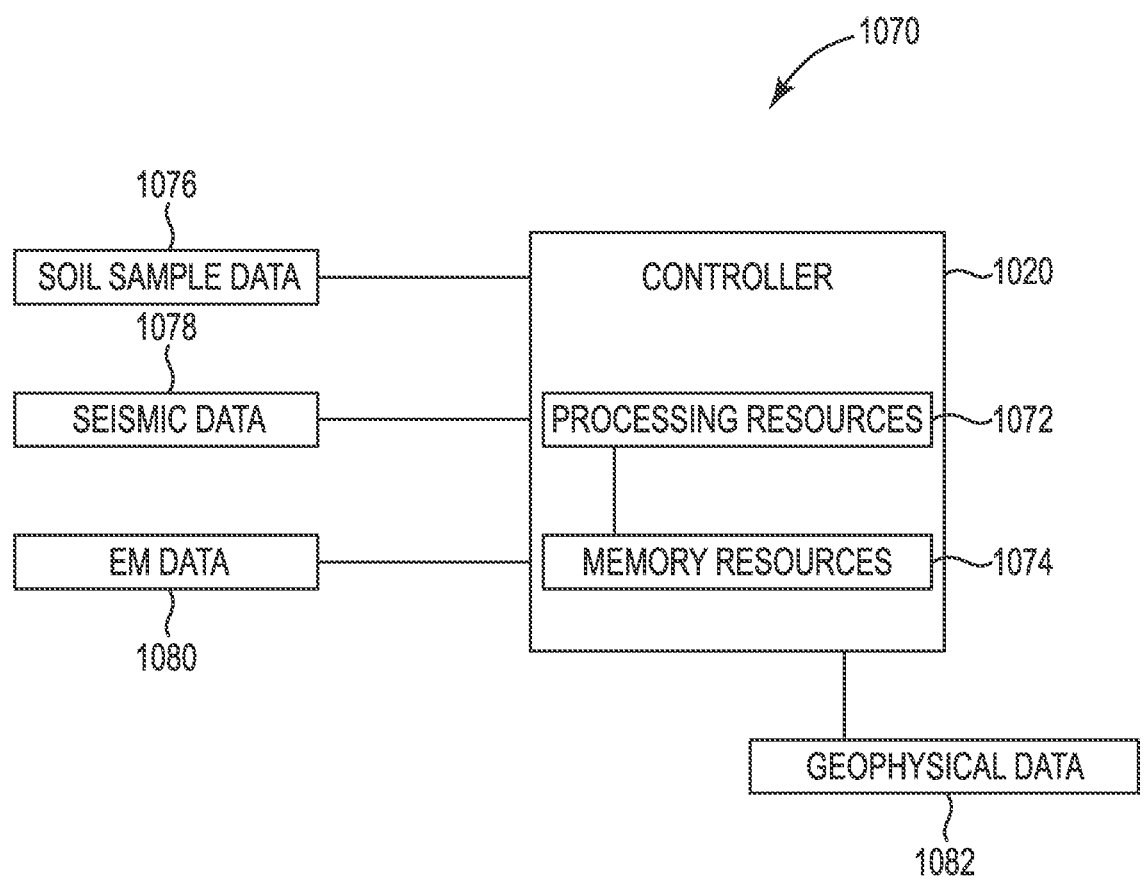
FIG. 10 illustrates an exemplary embodiment of a system for use with a marine survey node.

FIG. 10 illustrates an exemplary embodiment of a system 1070 for use with a marine survey node. The controller 1020 can be analogous to the controller 120 illustrated in FIG. 1, or to a computer not associated with a marine survey vessel, or to a controller internal to a marine survey node. The system 1070 can include a controller 1020 configured to receive soil sample data 1076, seismic data 1078, and/or EM data 1080 via one or more communication links. The controller 1020 can include processing resources 1072 and memory resources 1074. Examples of processing resources include a processor, combinational logic, a field programmable gate array, an application specific integrated circuit, etc. The controller 1020 can include a combination of hardware and machine-readable instructions, which may also be referred to as program instructions. The program instructions can be stored in the memory resources 1074 or embodied in the processing resources 1072, which are configured to perform a number of functions described herein. For example, the program instructions can be analogous to those described with respect to FIG. 9. The controller 1020 can be configured to execute instructions to analyze soil sample data 1076 or process seismic data 1078 or EM data 1080 to generate geophysical data 1082. The geophysical data can be an estimate of a physical property of a subsurface location, such as the presence of a reservoir that may contain hydrocarbons. The geophysical data 1082 can be a seismic or EM image of a subsurface location. The program instructions, such as software, firmware, etc., can be stored in a memory resource such as a machine-readable medium, etc., as well as hard-wired program such as logic. Hard-wired program instructions can be considered as both program instructions and hardware.

The controller 1020 can utilize software, hardware, firmware, and/or logic to perform a number of functions. The controller 1020 can be a combination of hardware and program instructions configured to perform a number of functions and/or actions. The hardware, for example, can include a number of processing resources 1072 and a number of memory resources 1074, such as a machine-readable medium or other non-transitory memory resources. Although illustrated as being internal to the controller 1020, the memory resources 1074 can be internal and/or external to the controller 1020. In at least one embodiment, the controller 1020 can include internal memory resources 1074 and have access to external memory resources. The program instructions, such as machine-readable instructions, can include instructions stored on the machine-readable medium to implement a particular function. The set of machine-readable instructions can be executable by one or more of the processing resources 1072. The memory resources 1074 can be coupled to the controller 1020 in a wired and/or wireless manner. For example, the memory resources 1074 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

The memory resources 1074 can be non-transitory and can include volatile and/or non-volatile memory. Volatile memory can include memory that depends upon power to store data, such as various types of dynamic random-access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and/or a solid-state drive, etc., as well as other types of non-transitory machine-readable media.

The processing resources 1072 can be coupled to the memory resources 1074 via a communication path. The communication path can be local or remote to the controller 1020. Examples of a local communication path can include an electronic bus internal to a machine, where the memory resources are in communication with the processing resources via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resources are remote from the processing resources, such as in a network connection between the memory resources and the processing resources. That is, the communication path can be a network connection. Examples of such a network connection can include a local area network, wide area network, personal area network, and the Internet, among others.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A marine survey node, comprising:
   a body configured to be deployed to a seabed;
   a marine survey receiver coupled to the body and configured to acquire marine survey data; and
   a soil sample module associated with the body and configured to:
      be driven into the seabed by a negative buoyancy of the marine survey node such that the soil sample module anchors the marine survey node to the seabed; and
      collect a soil sample from the seabed.

2. The marine survey node of claim 1, wherein the marine survey receiver comprises a seismic sensor housed within the body.

3. The marine survey node of claim 2, further comprising a plurality of attachment points in the body each configured to receive a respective electromagnetic sensor.

4. The marine survey node of claim 1, wherein the marine survey receiver comprises an electromagnetic sensor.

5. The marine survey node of claim 1, wherein the body of the marine survey node is floodable to provide a configurable buoyancy for the marine survey node.

6. The marine survey node of claim 1, wherein the soil sample module is further configured to provide electromagnetic grounding for the marine survey node.

7. The marine survey node of claim 1, wherein the soil sample module comprises a vessel coupled to a spike;
   wherein the spike is configured to penetrate the seabed; and
   wherein the spike comprises an inlet configured to collect the soil sample and to equalize pressure between an inside of the vessel and an outside of the vessel.

8. The marine survey node of claim 7, wherein a valve is coupled to the vessel;
   wherein the valve is configured to maintain a pressure difference between the vessel and the spike when closed;

wherein the valve is configured to equalize a pressure between the vessel and the spike when open to collect the soil sample.

9. The marine survey node of claim 7, wherein the vessel passes through the body; and
wherein the soil sample module is removably coupled to the body.

10. The marine survey node of claim 7, wherein the vessel comprises one of a group of vessels including a cylindrical body and a polygonal body; and
wherein the spike comprises one of a group of spikes including a conical body and a pyramidal body.

11. A method, comprising:
deploying a plurality of marine survey nodes onto a seabed, each including a respective soil sample module;
wherein deploying includes driving the respective soil sample module into the seabed by a negative buoyancy of a respective marine survey node such that the respective soil sample module anchors the respective marine survey node to the seabed;
acquiring marine survey data with the plurality of marine survey nodes; and
collecting a soil sample with the respective soil sample modules.

12. The method of claim 11, further comprising deploying an additional plurality of marine survey nodes, not including soil sample modules, onto the seabed; and
acquiring marine survey data with the additional plurality of marine survey nodes.

13. The method of claim 11, further comprising actuating a valve of the respective soil sample module so that a soil sample from the seabed enters a vessel of the respective soil sample module; and
actuating the valve again to seal the vessel.

14. The method of claim 11, further comprising, prior to deploying a particular one of the plurality of marine survey nodes, sealing a vessel of the respective soil sample module.

15. The method of claim 14, further comprising, reducing a pressure in the vessel after sealing the vessel.

16. The method of claim 11, wherein acquiring the marine survey data comprises acquiring at least one of seismic data and electromagnetic data.

17. The method of claim 11, further comprising performing at least one of microplastic testing and absorbed gas testing on the soil samples.

18. The method of claim 11, further comprising pollution mapping over an area of the marine survey based on the soil samples.

19. A method to manufacture a geophysical data product, the method comprising:
acquiring marine survey data from a marine survey including a marine survey node comprising a marine survey receiver and a soil sample module driven into a seabed by a negative buoyancy of the marine survey node such that the soil sample module anchors the marine survey node to the seabed;
wherein the marine survey data includes soil sample data and at least one of seismic data and electromagnetic data;
processing the at least one of seismic data and electromagnetic data to generate first geophysical data;
processing the soil sample data to generate second geophysical data; and
recording the first geophysical data and the second geophysical data on at least one non-transitory machine-readable medium, thereby creating the geophysical data product.

20. The method of claim 19, wherein processing the at least one of seismic data and electromagnetic data comprises processing the at least one of seismic data and electromagnetic data offshore or onshore.

* * * * *